July 27, 1937.  H. M. SPELMAN, JR  2,088,158

METHOD OF LINING SHOE UPPERS

Filed Nov. 20, 1935

Inventor
Henry M. Spelman Jr.
By Theodore C. Browne
Attorney

Patented July 27, 1937

2,088,158

UNITED STATES PATENT OFFICE 2,088,158

METHOD OF LINING SHOE UPPERS

Henry M. Spelman, Jr., Cambridge, Mass., assignor to Dewey and Almy Chemical Company, North Cambridge, Mass., a corporation of Massachusetts Application November 20, 1935, Serial No. 50,716

8 Claims. (Cl. 18—59)

There are many operations involving rubber cement in shoe manufacture where it is quite necessary to obtain as strong and as permanent a cementing action as is possible. Generally speaking, (there are important exceptions), any rubber cement for shoes deteriorates less, is stronger, creeps less and holds the parts together much more firmly after it is "cured".

Obviously, it is impossible to subject a leather shoe to any temperature sufficient to vulcanize rubber unless very active accelerators are added to the cement, and, because rubber in cement has an enormously developed surface exposed to contact with the accelerators and sulphur, a progressive slow cure is brought about even at room temperature. Curing type cements, consequently, have a very short useful life. In practice, they are shipped as two components; one, the rubber cement, and; two, the sulphur and accelerators. Just before use, the shoe manufacturer mixes these. Any cement which he does not use shortly afterwards must be thrown away because the progressive curing and the consequent thickening make spreading of the cement impossible.

Figure 1:
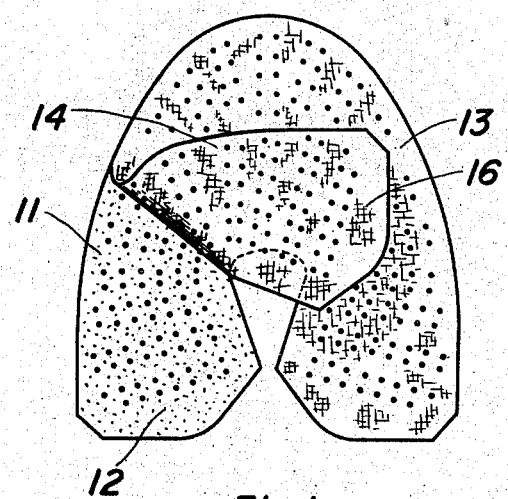
Figure 2:
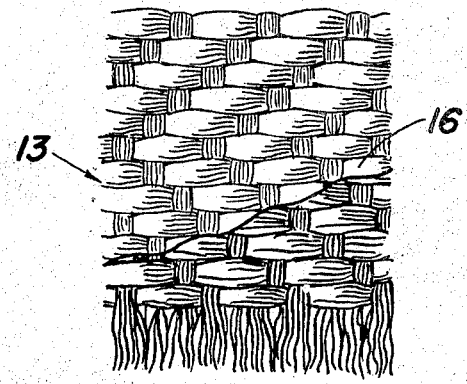
Figure 3:
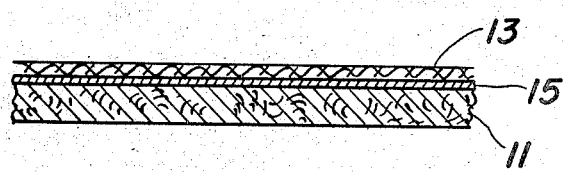
Figure 4:
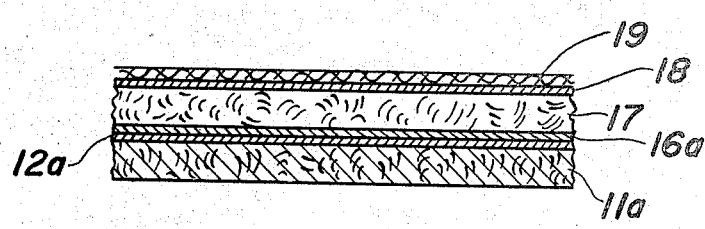

The broad aspect of my invention has for its object to avoid the loss of unused cement and to expedite and cheapen procedures in which the vulcanizing cement is used, but more specific objects are to obviate the need of mixing cement in the shoe factory and to eliminate the operation of applying cement to one of the complementary cemented parts. My object, also, is to secure important mechanical advantages in the construction and durability of perforated footwear. Further objects will appear from the specification and from the drawing in which Fig. 1 illustrates my invention as applied to a vamp and vamp lining; Fig. 2 illustrates the preferred weave of fabric with the coating applied; Fig. 3 is a section through the lining; and, Fig. 4 shows a modification of my invention including a fibrous sheet or "plumper".

I have found that it is possible to secure a firm, vulcanized bond between complementary parts if but one of these parts be coated with a rubber cement which contains no accelerator and preferably no sulphur or equivalent vulcanizing agent, if I first cover the complementary part with a wash which includes these necessary ingredients. When the parts are later joined, the sulphur and accelerator migrate into the cement and effect the cure of the rubber.

Without implying any limitations and only for convenience of description, I shall describe my invention as applied to the attachment of the vamp linings to vamps. Other applications of my invention are apparent.

The difficulty of handling vulcanizing types of cement in the shoe factory has militated against their general use and, consequently, the shoe manufacturer has adopted such expedients as leaving the vamp lining totally unattached to the vamp or has stuck it thereto with but a few spots of a cement which usually has not been vulcanized. These trade solutions are not practical when the vamp is perforated as in summer footwear, because the loose lining shifts and closes the holes. It may also fray and, in that case, an annoying, dingy fuzz creeps through the perforations. Again, if a normal non-vulcanizing cement is used to attach the whole vamp, not only does the lining shift, but, after shifting, the cement on the lining creeps through the perforations and stains their margins. In some other cases, the unvulcanized cement breaks down and causes staining even though no creeping has occurred.

The only practical solution of the problem presented by the perforated vamp is to attach the vamp lining to the vamp with a vulcanizing type of cement. This, prior to my invention, has introduced the manufacturing difficulties which I have set forth.

The type of lining which I prefer is known as coutil, the weave illustrated in Fig. 2. It is obvious that any other type of weave is usable with this invention, but, the particular weave which I have selected has peculiar advantages as applied to shoe linings. It may be perforated without causing the cut threads to slide, or to migrate and it is the densest fabric possible to manufacture per pound of cotton content. Its breaking strength is more than three times that of the sheep leather quarter lining which previously has been used for this purpose. The density of the weave, in combination with the over-all attachment to the leather prevents all stretching of cut or perforated white buck shoes and maintains a neat, well-lasted appearance throughout their life, a result not achieved by any other lining of which I am aware.

The coutil, in the piece, is placed on a coating machine and a solution of sulphur and accelerator is applied by any of the well known coating procedures. The coutil is then dried and packaged. The adhesive material which holds the sulphur and accelerator on the fabric may be any of the glue, starch or casein sizings which have sufficient body to hold the sulphur and accelerator in suspension, but rubber may also be used. I use a cement which may be of the "solvent" type, but, to avoid health and fire hazards, is preferably a water dispersion of rubber and I coat the vamp with this cement shortly before the vamp lining is applied. In the shoe factory, my especially treated lining is handled just as are other lining materials. Vamp linings, quarter linings, etc. are cut out from the piece by means of a "clicker".

I find that the bond between the lining and the leather is usually somewhat better if the lining be pressed in close contact with the vamp while the cement still contains a considerable amount of moisture, but, thereafter, the lined vamp is worked into the upper and lasted without departure from the conventional shoe manufacturing practice.

Should the shoes go through the dryer (the usual dryer temperature is 140° Fahrenheit), the vulcanized bond between the lining and the leather is developed at the end of the normal drying time. If the shoes are not dried at an elevated temperature, the development of the vulcanized bond is much slower but is excellent by the time that the shoes reach the ultimate user.

In the case of the formulae disclosed below, curing takes place in from 12 to 48 hours in atmospheric temperatures and in from 4 to 5 hours in a dryer.

*Fabric coating Formula #1*

| | |
|---|---|
| Animal glue | 10. |
| Sulphur | 2. |
| Pentamethylene-dithio-carbamate | 1. |
| Tetramethylthiuram-monosulphide | 0.75 |
| Water to give viscosity desired | x |

*Fabric coating Formula #2*

| | |
|---|---|
| Rubber (solids) | 100. |
| Sulphur | 4. |
| Zinc oxide | 6. |
| Water | |

*Leather cement Formula #1*

| | |
|---|---|
| Rubber (solids) | 100. |
| Zinc oxide | 5. |
| Rubber solvents, or water also present | |

*Leather cement Formula #2*

| | |
|---|---|
| Rubber (solids) | 100. |
| Pentamethylenedithio-carbamate | 1.25 |
| Tetramethylthiuram-monosulphide | 1. |
| Water or solvent | |

*Formula of Combination #1*

| | |
|---|---|
| Rubber (solids) | 100. |
| Zinc oxide | 5. |
| Sulphur | 2. |
| Pentamethylene-dithio-carbamate | 1. |
| Tetramethylthiuram-monosulphide | 0.75 |
| Glue | 10.0 |

*Formula of Combination #2*

| | |
|---|---|
| Rubber (solids) | 200. |
| Sulphur | 4. |
| Zinc oxide | 6. |
| Pentamethylene-dithio-carbamate | 1.25 |
| Tetramethylthiuram-monosulphide | 1. |

Although, as the formulae show, I prefer to use a cement containing only dispersed or dissolved rubber and an activator (zinc oxide), cements containing rubber, activator and sulphur, or cements containing rubber, activator, and accelerator may be used and such combinations are within the scope of my invention.

In the drawing, Fig. 1 illustrates my invention as applied to a perforated vamp. The vamp, 11, has been coated with a water dispersed rubber cement, 12, and covered by the coutil vamp lining, 13. The figure shows a portion, 14, of the vamp lining, 13, turned back better to illustrate its construction. The coating, 16, containing ingredients essential for the vulcanization of rubber (sulphur and accelerators) is shown on the inner surface of the vamp lining, 13.

The coutil vamp lining, 13, is shown in plan view in Fig. 2. This drawing was made from a micro-photograph taken at 18 diameters magnification and illustrates the nature of the weave. The coating containing the sulphur and accelerators (which is practically indistinguishable from sizing in the finished goods) is shown in the area marked 16. Fig. 3 is a sectional view showing the lining, 13, the cementing layer, 15 (the result of the combination of the cement, 12, and the coating, 16), and the leather vamp 11.

A modification of my invention is shown in Fig. 4 where a fibrous web, 17, has been cemented by means of an ordinary doubling cement, 18, to an untreated fabric lining, 19. The coating, 16a, which carries ingredients necessary for the vulcanization of rubber, is, in this instance, applied to the exterior surface of the web, 17, and not to the coutil fabric. The web, 17, thus acts as a "plumper". I find that this material is very satisfactory in many light summer shoes; in a number of instances, it makes the use of box toes unnecessary. This material is joined to the leather, 11a, in exactly the same manner as is the lining alone.

For clarity, a cement on the leather is indicated as a separate layer, 12a, but it should be understood that the coating, 16a, and the layer, 12a, lose their separate identities and become merely a layer of vulcanized cement shortly after the coated, plumped lining and the cemented leather have been brought into contact.

It is by no means necessary that any particular fabric be used or even that the lining be a fabric. Leather may be joined to leather, or felted or garnetted materials may be used in this manner as the cementing of felt heel pads shows. Weblike materials can be practically impregnated with the cement, or merely stuck at their surface for the amount of cement entering the material entirely depends upon the thickness of the rubber cement coat placed on the base and the pressure applied immediately after the parts have been joined. The fact that the rubber cement does not thicken or gel on standing, but remains a fluid of relatively low viscosity, permits this controllable penetration to be brought about.

The shoe manufacturer may now use a cement having an indefinite life and thus avoid all spoilage and waste of cement. Further, one operation, previously performed in the shoe factory, is eliminated since it is no longer necessary to apply cement to a vamp lining or to any of the other lining components of the shoe.

I claim:

1. A lining comprising a closely woven, coutil fabric having a coating thereon containing substances capable of causing the vulcanization of rubber.

2. A lining comprising a closely woven, coutil fabric having a coating thereon containing substances capable of accelerating the vulcanization of rubber.

3. A plumped lining comprising a fabric and a fibrous web adhesively attached thereto having on its exterior surface substances essential for the vulcanization of rubber.

4. The process of applying fabric linings which includes applying to the lining in the piece a coating including a substance essential for the vulcanization of rubber of the class comprising rubber vulcanization agents and vulcanization accelerators, coating the material to be lined with a rubber containing cement incapable of self-vulcanization, placing the coated lining against the cemented surface and then maintaining the lining and the material in such close contact at an appropriate temperature and for a sufficient time that the substance is caused to migrate into the cement and, at low temperatures, to bring about the formation of a vulcanate with the rubber therein.

5. In the manufacture of lined shoes, the process of attaching vamp and quarter linings to the upper which includes coating a portion of the vamp or quarter with a rubber cement incapable of self-vulcanization, applying to the cemented surface a dry fabric lining having a coating thereon including agents which promote the vulcanization of rubber, and, thereafter, maintaining the vamp or upper in such close contact with the lining that vulcanization of the rubber is brought about.

6. The process of applying linings to a fabricated article which includes coating a portion of the article with a cement containing rubber and incapable of self-vulcanization, applying to the cemented surface a dry lining having a coating thereon containing a substance of the class including vulcanization agents and accelerators, and maintaining the article and lining in such close contact that vulcanization of the rubber in the cement is brought about.

7. The new product comprising a lining fabric having a dried coating thereon including a rubber vulcanizing agent in an amount sufficient to form a rubber vulcanate with the rubber of a cement coating against which the lining is adapted to be placed.

8. The new product comprising a lining fabric having a dried coating thereon including a rubber vulcanization accelerator in sufficient amount to cause, in conjunction with a rubber vulcanizing agent, the low temperature vulcanization of a rubber cement coating against which the lining is adapted to be placed.

HENRY M. SPELMAN, Jr.